United States Patent
He et al.

(10) Patent No.: US 11,420,898 B2
(45) Date of Patent: Aug. 23, 2022

(54) HIGH STRENGTH ULTRATHIN GLASS AND METHOD OF MAKING THE SAME

(71) Applicant: SCHOTT Glass Technologies (Suzhou) Co. Ltd., Suzhou (CN)

(72) Inventors: Feng He, Jiangsu (CN); Huiyan Fan, Jiangsu (CN); Jose Zimmer, Shanghai (CN)

(73) Assignee: SCHOTT Glass Technologies (Suzhou) Co. Ltd., Jiangsu (CN)

( * ) Notice: Subject to any disclaimer, the term of this patent is extended or adjusted under 35 U.S.C. 154(b) by 69 days.

(21) Appl. No.: 16/171,960

(22) Filed: Oct. 26, 2018

(65) Prior Publication Data

US 2019/0062200 A1     Feb. 28, 2019

Related U.S. Application Data

(63) Continuation of application No. PCT/CN2016/080773, filed on Apr. 29, 2016.

(51) Int. Cl.

| | |
|---|---|
| C03C 3/097 | (2006.01) |
| C03B 17/06 | (2006.01) |
| C03C 3/078 | (2006.01) |
| C03C 3/083 | (2006.01) |
| C03C 3/085 | (2006.01) |
| C03C 3/087 | (2006.01) |
| C03C 3/091 | (2006.01) |
| C03C 3/093 | (2006.01) |
| C03C 4/18 | (2006.01) |
| C03C 17/00 | (2006.01) |
| C03C 21/00 | (2006.01) |

(52) U.S. Cl.
CPC .......... *C03C 3/097* (2013.01); *C03B 17/064* (2013.01); *C03C 3/078* (2013.01); *C03C 3/083* (2013.01); *C03C 3/085* (2013.01); *C03C 3/087* (2013.01); *C03C 3/091* (2013.01); *C03C 3/093* (2013.01); *C03C 4/18* (2013.01); *C03C 17/002* (2013.01); *C03C 21/002* (2013.01); *C03C 2204/00* (2013.01)

(58) Field of Classification Search
None
See application file for complete search history.

(56) References Cited

U.S. PATENT DOCUMENTS

| | | | |
|---|---|---|---|
| 7,207,193 B2 * | 4/2007 | Xun | ............... C03B 17/064 65/115 |
| 8,415,013 B2 | 4/2013 | Barefoot et al. | |
| 8,840,997 B2 | 9/2014 | Koyama et al. | |
| 9,212,084 B2 | 12/2015 | Wang et al. | |
| 9,322,716 B2 | 4/2016 | Kusukame et al. | |
| 9,344,901 B2 | 5/2016 | Kanamarlapudi et al. | |
| 10,071,933 B2 | 9/2018 | Wang et al. | |
| 2009/0220761 A1* | 9/2009 | Dejneka | ............... C03B 27/04 428/220 |
| 2010/0009154 A1 | 1/2010 | Allan et al. | |
| 2012/0048604 A1 | 3/2012 | Cornejo et al. | |
| 2013/0065748 A1* | 3/2013 | Koyama | ............... C03B 17/064 501/67 |
| 2013/0255314 A1* | 10/2013 | Allan | .................... C03B 17/067 65/30.14 |
| 2014/0005911 A1 | 1/2014 | Menold et al. | |
| 2015/0093561 A1* | 4/2015 | Tokunaga | ............... C03C 15/00 428/220 |
| 2015/0166405 A1 | 6/2015 | Murata et al. | |
| 2015/0183680 A1 | 7/2015 | Barefoot et al. | |
| 2015/0329418 A1* | 11/2015 | Murata | .................... C03C 17/23 428/215 |
| 2016/0002103 A1 | 1/2016 | Wang et al. | |
| 2017/0107141 A1* | 4/2017 | Miyasaka | ............. C03B 25/025 |

FOREIGN PATENT DOCUMENTS

| | | | |
|---|---|---|---|
| JP | 2012-214346 A | 11/2012 | |
| JP | 2015-051882 | * 3/2015 | ............. C03C 21/00 |
| JP | 2015-51882 A | 3/2015 | |
| WO | 2017/185354 A1 | 11/2017 | |

OTHER PUBLICATIONS

Notification of Transmittal of the International Search Report and the Written Opinion of the International Searching Authority or the Declaration dated Feb. 4, 2017 for International Application No. PCT/CN2016/080773 (13 pages).
Japanese Office Action dated Nov. 18, 2019 for Japanese Patent Application No. 2018-556375 (6 pages).
Translation of Japanese Office Action dated Nov. 18, 2019 for Japanese Patent Application No. 2018-556375 (8 pages).
South Korean Office Action dated Mar. 9, 2020 for South Korean Application No. 10-2018-7034509 (5 pages).
English translation of South Korean Office Action dated Mar. 9, 2020 for South Korean Application No. 10-2018-7034509 (6 pages).
Japanese Office Action dated Aug. 11, 2020 for Japanese Patent Application No. 2018-556375 (4 pages).
English Translation of Japanese Office Action dated Aug. 11, 2020 for Japanese Patent Application No. 2018-556375 (4 pages).
Korean Office Action dated Oct. 21, 2020 for Korean Patent Application No. 10-2018-7034509 (5 pages).
English translation of Korean Office Action dated Oct. 21, 2020 for Korean Patent Application No. 10-2018-7034509 (6 pages).
Chinese Office Action dated Nov. 12, 2020 for Chinese Application No. 201680085052.0 (11 pages).

(Continued)

*Primary Examiner* — Frank J Vineis
*Assistant Examiner* — Nicole T Gugliotta
(74) *Attorney, Agent, or Firm* — Taylor IP, P.C.

(57) ABSTRACT

An ultrathin glass article has a thickness of less than or equal to 0.5 mm. The glass has a low TTV and a large threshold diffusivity. The glass has a working point $T_4$ of more than 1100° C. and a linear thermal expansion coefficient CTE of more than $6*10^{-6}/°$ C. in the temperature range between 25° C. and 300° C. A method for producing the article as well as the use of the article is also provided. The glass article can be chemically strengthened and forms surface compressive stress layers on surfaces and center tension layer in the center. The toughened ultrathin glass sheet is more flexible and has extraordinary thermal shock resistance which makes it easier to handle for processing.

35 Claims, No Drawings

(56) References Cited

OTHER PUBLICATIONS

English translation of Chinese Office Action dated Nov. 12, 2020 for Chinese Application No. 201680085052.0 (13 pages).
Japanese Office Action dated Mar. 1, 2021 for Japanese Patent Application No. 2018-556375 (8 pages).
English translation of Japanese Office Action dated Mar. 1, 2021 for Japanese Patent Application No. 2018-556375 (10 pages).
Korean Office Action dated Apr. 29, 2021 for Korean Patent Application No. 10-2018-7034509 (7 pages).
English translation of Korean Office Action dated Apr. 29, 2021 for Korean Patent Application No. 10-2018-7034509 (9 pages).
Observations by Third Party dated Dec. 29, 2020 for Japanese Patent Application No. 2018-556375 (6 pages).
English translation of Observations by Third Party dated Dec. 29, 2020 for Japanese Patent Application No. 2018-556375 (11 pages).
Chinese Office Action dated Jul. 1, 2021 for Chinese Application No. 201680085052.0 (18 pages).
English translation of Chinese Office Action dated Jul. 1, 2021 for Chinese Application No. 201680085052.0 (24 pages).
Japanese Office Action dated Aug. 3, 2021 for Japanese Application No. 2018-556375 (6 pages).
English translation of Japanese Office Action dated Aug. 3, 2021 for Japanese Application No. 2018-556375 (6 pages).
Chinese Office Action dated Nov. 18, 2021 for Chinese Office Action No. 201680085052.0 (10 pages).
English translation of Chinese Office Action dated Nov. 18, 2021 for Chinese Office Action No. 201680085052.0 (13 pages).

* cited by examiner

HIGH STRENGTH ULTRATHIN GLASS AND METHOD OF MAKING THE SAME

CROSS REFERENCE TO RELATED APPLICATIONS

This is a continuation of PCT application No. PCT/CN2016/080773, entitled "HIGH STRENGTH ULTRATHIN GLASS AND THE MAKING METHOD THEREFORE", filed Apr. 29, 2016, which is incorporated herein by reference.

BACKGROUND OF THE INVENTION

1. Field of the Invention

The present disclosure is related to an ultrathin glass article with both small total thickness variation (TTV) and excellent chemical toughening performance. The article may be made by direct hot-forming. The glass has a high forming temperature and high CTE. The disclosure is also related to use of the high strength flexible glass as flexible universal plane in flexible and printed electronics, sensor for touch control panels, thin film battery substrates, mobile electronic devices, semiconductor interposers, bendable displays, solar cells, or other applications where a combination of high chemical stability, temperature stability, low gas permeability, flexibility, and low thickness is necessary. Besides consumer and industrial electronics said glass could also be used for protection applications in industrial production or metrology.

2. Description of the Related Art

Thin glasses with different compositions are suitable substrate material for many applications where transparency, high chemical and thermal resistance, and defined chemical and physical properties are important. For example, alkaline free glasses can be used for display panels and as electronic packaging materials in wafer format. The alkaline contained borosilicate glasses are used for filter coating substrate, touch sensor substrate, and fingerprint sensor module cover.

In present times, the continuous demand for new functionality of product and wider area of applications call for glass substrates even thinner and lighter with small TTV and extremely high strength. The fields in which ultrathin glass typically applied are protective cover of fine electronics.

To achieve extremely high strength, aluminosilicate (AS) glass with high alumina content, which can reach high compressive strength (CS), depth of layer (DoL), and high resultant strength, after immersing in K ion content melt salt, is required. Here the typical surface compressive stresses (CS) are between 600 and 1000 MPa. Depth of ion-exchange layers (DoL) is typically bigger than 30 μm, and preferred to be bigger than 40 μm. For safety protection application in transportation or aviation, AS glasses could have exchange layers higher than 100 μm. Normally high CS combined with high DoL is targeted for all these applications, and thickness of such glass usually ranges from about 0.5 mm to 10 mm.

On the other hand, if glass sheets gets thinner than 0.5 mm, handling gets more difficult mainly due to defects such as cracks and chippings at the glass edges which lead to breakage. Also, the overall mechanical strength i.e. reflected in bending or impact strength, will be significantly reduced. Usually, the edge of thicker glass can be CNC (computer numerical control) grinded to remove the defects, but the mechanical grinding is hardly applied for ultrathin glass with thickness less than 0.3 mm. Etching on the edge could be one solution for ultrathin glass to remove defects, but the flexibility of the thin glass sheet is still limited by the low bending strength of the glass itself. As a result, strengthening of the glasses is extremely important for thin glasses.

Typically, <0.5 mm thick flat ultrathin aluminosilicate glasses with low TTV are hard to produce by direct hot-forming methods. Compared with post-treated thin aluminosilicate glass by chemical or physical methods, the direct hot-formed thin glass has much better surface uniformity, TTV and surface roughness because the surfaces are cooled down from a high temperature melting state to room temperature. Down-drawn methods can be used to produce glass thinner than 0.3 mm or even 0.1 mm, such as alkali borosilicate glasses or alkaline free aluminoborosilicate glasses. However, such glasses do not have the combined, high forming temperature $T_4$, defined as the temperature at which the viscosity of glass is $10^4$ dPa*s, and high CTE (coefficient of thermal expansion).

Aluminosilicate glass is particularly suitable for chemical toughening because of the high content of $Al_2O_3$ that enables fast diffusion of alkali metal ions. Thus, it would be useful if an ultrathin and chemically toughenable or toughened aluminosilicate glass article with small TTV was available. However, the main challenge for producing hot-formed flat ultrathin glass which can be chemically strengthened to high strength lies in combined high $T_4$ and high CTE of such aluminosilicate glass that contains both relatively high content of $Al_2O_3$, which leads to high $T_4$, and fair amount of $Na_2O$ and $K_2O$, which leads to high CTE. Thus, such a glass requires high forming temperatures due to the high $T_4$ and is prone to developing tensions and deformations up to breakage upon temperature changes due to the high CTE. Consequently, direct hot-forming of such a glass is extremely difficult and ultrathin glass with small TTV was not possible so far.

Chemical toughening of glass has been described previously. U.S. Patent Application Publication No. 2010/0009154 describes a glass of 0.5 mm or thicker with an outer region of compressive stress, the outer region has a depth of layer of at least 50 μm and the compressive stress is at least higher than 200 MPa. Chemical toughening and the step of creating a compressive stress in the surface region comprise successively immersing at least a portion of the glass in a plurality of ion exchange baths. Such glass can be used for consumer applications. However, excellent chemical toughening performance of ultrathin glass with small TTV is not achieved.

The descriptions of chemically toughenable ultrathin glass with many limitations are found in some publications. U.S. Patent Application Publication No. 2015/183680 describes a toughening of <0.4 mm glass with limited range of central tension range and DoL>30 μm. However, DoL>30 μm leads to problems like fragility and self-breakage in ultrathin toughened glass. Furthermore, how the <0.4 mm thick glass is prepared is not illustrated in this publication. Moreover, excellent chemical toughening performance of ultrathin glass with small TTV is not achieved.

U.S. Patent Application Publication No. 2014/05911 describes the hot-forming of toughenable ultrathin glasses which has CTE change less than $107*10^7$/° C. from liquidus state and room temperature. However, such CTE is not identified as influencing factors for producing chemically toughenable ultrathin glass by direct form methods. Once again, the production of ultrathin glass is not considered in this application. Moreover, excellent chemical toughening performance of ultrathin glass with small TTV is not achieved.

In U.S. Patent Application Publication No. 2012/0048604, ultrathin ion-exchangeable aluminosilicate or aluminoborosilicate glass sheet is used as interposer panels for electronics. The interposer panels include a glass substrate core formed from an ion-exchangeable glass. The CTE could be set to match those with semiconductors and metallic materials and the like. The production way of glass and how to improve the surface quality and thickness uniformity are not considered in this publication. In fact, the adjustment of glass composition to facilitate the direct hot-forming production and at the same time achieve the good toughening capability is the most important way to get ultrathin glass with small TTV and low surface roughness.

What is needed in the art is an ultrathin glass that can be directly hot formed and chemically strengthened to produce a high strength glass with a small TTV.

SUMMARY OF THE INVENTION

Exemplary embodiments of the present disclosure provide direct hot-forming of an ultrathin glass which can achieve high strength after toughening and which has small TTV. It is surprisingly found that glass with both high forming temperature and high CTE can be hot-formed from melting state by leading liquidus glass downwards either by self-gravity or the assistance of additional drawing forces. This ultrathin glass forming capability makes the direct hot-forming production of alkaline metal contained aluminosilicate glass, which exhibits high $T_4$ and high CTE properties, possible. It is surprisingly found that the inverse stiffness, expressed in the form of density over Young's modulus, should be low to assure the stable production of such ultrathin glass. It has been found that the cooling regimen during hot-forming in the temperature range between a transition temperature of the glass $T_g+100°$ C. and $T_g-50°$ C. is important for achieving the excellent chemical toughening performance of ultrathin glass with small TTV.

In some embodiments a chemically toughenable glass article is provided that has a thickness of less than or equal to 0.5 mm wherein the glass has a working point $T_4$ of more than 1100° C. and wherein the glass in the temperature range between 25° C. and 300° C. has an average linear thermal expansion coefficient CTE of more than $6*10^{-6}/°$ C. The article has a threshold diffusivity D of at least 1.5 $\mu m^2$/hour and a total thickness variation (TTV) in the area of 0.4 m*0.5 m of less than 40 μm for articles having a thickness of more than 200 μm, a TTV in the area of 0.4 m*0.5 m of less than 20% of the thickness of the article for articles having a thickness of between 50 μm and 200 μm, and a TTV in the area of 0.4 m*0.5 m of at most 10 μm for articles having a thickness of less than 50 μm.

Some embodiments of the disclosure provide a method of making said glass article. The glass can be produced via down drawn or overflow fusion processes or special float or redraw or polishing down from thicker glass or slimming thicker glass by etching. The mother glass can be provided in the form of sheets or rolls. The mother glass may have a pristine surface with roughness $R_a$ less than 5 nm, then one or two of the surfaces of glass get ion exchanged and chemically toughened. The ultrathin glass can be applied in roll-to-roll processing.

It is surprisingly found that by controlling the cooling rate from $T_a$ (equal to $T_g+100°$ C.) to $T_b$ (equal to $T_g-50°$ C.) in a range of from 100 mm° C./min to 300 mm° C./min, such as a range of from 150 mm° C./min to 300 mm° C./min or a range of from 200 mm° C./min to 300 mm° C./min, such ultrathin glass with combined high $T_4$ and high CTE can be directly hot-formed to get the ultrathin glass article having excellent chemical toughening performance and small TTV.

In one embodiment, the glass is an alkali-containing glass, such as alkali aluminosilicate glass, alkali silicate glass, alkali borosilicate glass, alkali aluminoborosilicate glass, alkali boron glass, alkali germinate glass, alkali borogerminate glass, and combinations thereof.

DETAILED DESCRIPTION OF THE INVENTION

Prior to describing exemplary embodiments, explanations of several terms used throughout are provided.

Compressive Stress (CS): The induced compression among glass network after ion-exchange on the surface layer of glass. Such compression cannot be released by deformation of glass and sustained as stress. Commercially available test machine such as FSM6000 can measure the CS by waveguide mechanism.

Depth of Layer (DoL): The thickness of ion-exchanged layer where CS exists on the surface of glass. Commercially available test machine such as FSM6000 can measure the DoL by wave guide mechanism.

Central Tension (CT): When CS is induced on both sides of single glass sheet, to balance the stress according to the $3^{rd}$ principle of Newton's law, a tension stress must be induced in the center region of glass, and it is called "central tension". CT can be calculated from measured CS and DoL.

Average roughness ($R_a$): A measure of the texture of a surface. It is quantified by the vertical deviations of a real surface from its ideal form. Commonly amplitude parameters characterize the surface based on the vertical deviations of the roughness profile from the mean line. $R_a$ is an arithmetic average of the absolute values of these vertical deviations.

Working point ($T_4$): The temperature at which the glass may be fully re-shaped. It is defined as when the viscosity of glass is $10^4$ dPa·s.

Reference is now made to various exemplary embodiments, which are described further herein. Hot-forming of flat thin glass is difficult when the thickness of glass is thinner than 0.5 mm. Glass melt is cooled from high temperatures and starts forming to desired form at the viscosity of around $10^4$ d Pa·s. The temperature $T_4$ when the viscosity is $10^4$ dPa·s is therefore critical for the easiness of glass hot-forming. The lower the $T_4$, the easier is the glass forming, because the material and processing requirement of hot-forming devices is less high temperature compatible driven. Furthermore, lower $T_4$ usually means low melting and refining temperatures, which can significantly reduce the melting tank design efforts and the erosion of refractories, and the extended tank life time further guarantees the stable production of glass melt and, in turn, facilitates the hot-forming process of flat glass.

Besides the working point, another key parameter for successful production of flat thin glass is the CTE of glass. High quality thin glass requires small TTV, low surface roughness and low deformation, and, most importantly, no breakage. During the flat glass forming process, especially down draw and overflow fusion process, glass is quickly cooled down from $T_4$ to room temperature. This is especially true when glass gets thinner, since the glass belt flowing speed is faster to compensate for the lower unit weight of thin glass, so the cooling rate of thinner glass is also faster without modifying the annealing process. If the cooling rate is over the thermal shock threshold of glass, the glass belt breaks and no intact glass can be obtained. Even if the threshold is not reached, the fast cooling rate results in residual thermal stress if the CTE of glass is too high, and it further leads to high warp of produced glass.

Due to the difficulty of ultrathin flat glass forming, the existing ultrathin glass in the market has either low CTE, like alkaline-free aluminoborosilicate glass, or low $T_4$, like alkali borosilicate glass and general ultrathin soda-lime glass.

Exemplary embodiments of glass articles disclosed herein have an ultrathin glass article thickness less than or equal to 500 μm, such as less than or equal to 400 μm, less than or equal to 300 μm, less than or equal to 210 μm, less than or equal to 175 μm, less than or equal to 100 μm, less than 70 μm, or less than 50 μm. Such thin glasses are desired for various applications as described above. The thin thickness grants the glass flexibility.

The glass may contain relatively high amounts of $Al_2O_3$ in order to enable fast diffusion of alkali metal ions and thus to improve the ability to be chemically toughened. However, $Al_2O_3$ increases the working point $T_4$ of the glasses. Even in embodiments with a lower $Al_2O_3$-content, the working point $T_4$ of the glasses is higher than 1100° C. In some embodiments, the working point $T_4$ of the glasses is higher than 1150° C. Such high working points complicate the production of the glasses by direct hot-forming. However, it has been found how to obtain an ultrathin glass article with small TTV even from glasses with high $T_4$. Nevertheless, the working point $T_4$ should not be too high in order not to create too large of difficulties in production. Therefore, the working point $T_4$ may be lower than 1350° C., such as lower than 1300° C., lower than 1250° C., or lower than 1200° C.

In order for the glasses to be well suited for chemical toughening, the glasses contain relatively high amounts of alkali metal ions, such as sodium ions. However, thereby the average linear thermal expansion coefficient CTE in the temperature range between 25° C. and 300° C. is increased. In some embodiments, the glasses have a CTE higher than $7*10^{-6}/°$ C., such as higher than $8*10^{-6}/°$ C., or higher than $9*10^{-6}/°$ C. However, a high CTE also complicates production of the glasses by direct hot-forming. Therefore, the glasses can have a CTE lower than $13*10^{-6}/°$ C.

As described above, the glasses are very well chemically toughenable, which is correlated with high $T_4$ and high CTE. However, the combination of high $T_4$ and high CTE is disadvantageous for direct hot-forming. It has been found how to nevertheless obtain such glasses with very low thickness and small TTV. It has been found that the hot-forming difficulty coefficient being defined as the product of $T_4$ and CTE is a good measure for describing the ability of the glasses to be very well chemically toughenable but to also be obtainable by hot-forming. In some embodiments, the hot-forming difficulty index of the glasses is in the range of $8060*10^{-6}$ to $14000*10^{-6}$, such as in the range of $8600*10^{-6}$ to $14000*10^{-6}$, in the range of $9000*10^{-6}$ to $13000*10^{-6}$, in the range of $10000*10^{-6}$ to $12000*10^{-6}$, or in the range of $10500*10^{-6}$ to $11500*10^{-6}$.

During the production of ultrathin glass, the inverse stiffness, which is defined by density over Young's modulus, also plays an important role. High inverse stiffness leads to high flexibility, which leads to a higher degree of sagging and shaking of the thin glass belt drawn from the melt state and increases the risk of breakage and warp of the cooled ultrathin glass article. On the other hand, low inverse stiffness is good for maintaining the stability of the glass belt during the cooling process, but increases the risk of breakage when the ultrathin glass article is bent to a certain radius, which is usually easy for ultrathin glass under external force during hot-forming. Therefore, the inverse stiffness of the ultrathin glass article, in the unit of $(s/mm)^2$, may be in the range of 0.032 to 0.0355, such as in the range of 0.0325 to 0.0345, or in the range of 0.033 to 0.034.

For practical application in electronics, the glass article has a TTV in the area of 0.4 m*0.5 m of less than 40 μm for articles having a thickness of more than 200 μm, a TTV in the area of 0.4 m*0.5 m of less than 20% of the thickness of the article for articles having a thickness of between 50 μm and 200 μm, and a TTV in the area of 0.4 m*0.5 m of at most 10 μm for articles having a thickness of less than 50 μm. In some embodiments, the glass article has a TTV in the area of 0.4 m*0.5 m of less than 30 μm for articles having a thickness of more than 200 μm, a TTV in the area of 0.4 m*0.5 m of less than 15% of the thickness of the article for articles having a thickness of between 67 μm and 200 μm, and a TTV in the area of 0.4 m*0.5 m of at most 10 μm for articles having a thickness of less than 67 μm. In some embodiments, the glass article has a TTV in the area of 0.4 m*0.5 m of less than 20 μm for articles having a thickness of more than 200 μm, a TTV in the area of 0.4 m*0.5 m of less than 10% of the thickness of the article for articles having a thickness of between 100 μm and 200 μm, and a TTV in the area of 0.4 m*0.5 m of at most 10 μm for articles having a thickness of less than 100 μm. In some embodiments, the glass article has a TTV in the area of 0.4 m*0.5 m of less than 10 μm for articles having a thickness of equal to or less than 500 μm. Small TTV is key for today's highly precise electronics and optics devices. In the application of fingerprint sensors, the electrical signal transmission capacity over glass is limited; the smaller the TTV, the greater the nominal thickness that can be used for the fingerprint sensor cover, which in turn improves the mechanical stability. TTV is to be understood as the difference between the maximum thickness and the minimum thickness of the glass article in an indicated area. TTV can be measured by an on-line thickness meter. TTV may be measured according to SEMI MF 1530.

In addition to the method parameters described that enable obtaining a chemically toughenable ultrathin glass article with small TTV by direct hot-forming, the glass composition may also have an important influence on the relevant properties of the article and its availability by direct hot-forming.

To reach good chemical toughening performance, the glass should contain a fair amount of alkaline metal ions, such as $Na_2O$. Furthermore, adding a lower amount of $K_2O$ to the glass composition can also improve the chemical toughening rate. Furthermore, it has been surprisingly found that adding $Al_2O_3$ to the glass composition can significantly improve the toughening performance of the glass and result in much higher CS and DoL than non-$Al_2O_3$ containing glass. However, adding alkaline oxides increases the CTE of silicate glass and adding $Al_2O_3$ increase $T_4$ significantly. Both the increased CTE and $T_4$ make the forming of ultrathin glass more difficult.

$SiO_2$ is the major glass network former in the exemplary glasses described herein. Additionally, $Al_2O_3$, $B_2O_3$ and $P_2O_5$ may also be used as glass network formers. The content of the sum of $SiO_2$, $B_2O_3$ and $P_2O_5$ should not be less than 40% for common production method. Otherwise, the glass sheet may be difficult to form and could become brittle and lose transparency. A high $SiO_2$ content will require high melting and working temperature for glass production, usually it should be less than 90%. In some embodiments, the content of SiO2 in the glass is between 40 and 75 wt.-%, such as between 50 and 70 wt.-% or between 55 and 68 wt.-%. Adding the $B_2O_3$ and $P_2O_5$ to $SiO_2$ could modify the network property and reduce the melting and working temperature of glass. Also, the glass network former has big influence on the CTE of glass.

In addition, the $B_2O_3$ in the glass network forms two different polyhedron structures which are more adaptable to loading force from outside. Addition of $B_2O_3$ can result in lower thermal expansion and lower Young's modulus, which in turn leads to good thermal shock resistance and slower chemical toughening speed through which low CS and low DoL could be easily obtained. Therefore, the addition of $B_2O_3$ to ultrathin glass could improve the chemical toughening processing window and ultrathin glass and widen the practical application of chemically toughened ultrathin glass. In some embodiments, the amount of $B_2O_3$ in the glass is between 0 and 20 wt.-%, such as between 0 and 18 wt.-% or between 0 and 15 wt.-%. If the amount of $B_2O_3$ is too high, the melting point of the glass may be too high. Moreover, the chemical toughening performance is reduced when the amount of $B_2O_3$ is too high.

$Al_2O_3$ works both as glass network former and glass network modifier. The $[AlO_4]$ tetrahedral and $[AlO_6]$ hexahedral will be formed in the glass network, depending on the amount of $Al_2O_3$, and they could adjust the ion-exchanging speed by changing the size of space for ion-exchange inside glass network. Therefore, the glasses may comprise $Al_2O_3$ in an amount of at least 10 wt.-%, such as at least 14 wt.-%. However, if the content of $Al_2O_3$ is too high, the melting temperature and working temperature of glass will also be very high and crystals will be easily formed to make the glass lose transparency and flexibility. Therefore, the glasses may comprise $Al_2O_3$ in an amount of at most 40 wt.-%, such as at most 30 wt.-%, or most 27 wt.-%.

It has been surprisingly found that the ratio of the weight-proportions of $SiO_2$ to $Al_2O_3$ may have an important influence on the performance of the glass. If the ratio is very high, chemical toughening performance of the glass is rather low. However, if the ratio is very low, the glass may have extremely high $T_4$ and extremely high melting temperature, which drastically complicates the production of the glass by direct hot-forming. In some embodiments, the ratio of the weight-proportions of $SiO_2$ to $Al_2O_3$ is in the range of from 1.5 to 12, such as from 2 to 10, from 2.5 to 8, or from 3 to 7.

Alkaline oxides like $K_2O$, $Na_2O$ and $Li_2O$ work as the glass network modifier. They can break glass network and form non-bridge oxide inside the glass network. Adding alkaline could reduce the working temperature of glass and increase CTE of glass. Sodium and lithium content is important for ultrathin flexible glass which is chemically toughenable, for $Na^+/Li^+$, $Na^+/K^+$, $Li^+/K^+$ ion exchange is a necessary step for the toughening, the glass will not be toughened if it does not contain alkaline itself. However, sodium may be preferred over lithium because lithium may significantly reduce the diffusivity of the glass. Therefore, the glasses may comprise $Li_2O$ in an amount of less than 5 wt. %, such as at most 4 wt. %, at most 2 wt. %, at most 1 wt. %, or at most 0.1 wt. %. Some embodiments are even free of $Li_2O$.

The glasses may comprise $Na_2O$ in an amount of at least 4 wt. %, such as at least 5 wt. %, at least 6 wt. %, at least 8 wt. %, or at least 10 wt. %. Sodium is important for the chemical toughening performance as the chemical toughening may comprise the ion exchange of sodium in the glass with potassium in the chemical toughening medium. However, the content of sodium should also not be too high because the glass network may be severely deteriorated and the glass may be extremely hard to form. Another important factor is that ultrathin glass should have low CTE, to meet such requirement glass should not contain too much $Na_2O$. Therefore, the glasses may comprise $Na_2O$ in an amount of at most 30 wt. %, such as at most 28 wt. %, at most 27 wt. %, at most 25 wt. %, or at most 20 wt. %.

The glasses may comprise $K_2O$. However, as the glasses may be chemically toughened by exchanging sodium ions in the glass with potassium ions in the chemical toughening medium, too high of an amount of $K_2O$ in the glass will compromise the chemical toughening performance. Therefore, the glasses of the invention comprise $K_2O$ in an amount of at most 7 wt. %, such as at most 5 wt. %, at most 4 wt. %, at most 3 wt. %, at most 2 wt. %, at most 1 wt. %, or at most 0.1 wt. %. In some embodiments, the glasses are free of $K_2O$.

In some embodiments, the total amount of alkaline content not higher than 30 wt. %, such as not higher than 28 wt. %, or not higher than 27 wt. %, for the glass network may be severely deteriorated and the glass may be extremely hard to form. Another important factor is that ultrathin glass should have low CTE; to meet such requirement, the glass should not contain too much alkali elements. However, as described above, the glasses should contain alkali elements in order to facilitate chemical toughening. Therefore, the glasses may comprise alkali metal oxides in an amount of at least 4 wt. %, or at least 5 wt. %, or at least 7 wt. %, or at least 10 wt. %.

It has also been found that the ratio of the weight-proportion of the sum of $SiO_2$ and $Al_2O_3$ to the weight-proportion of alkali metal oxides in the glass may play an important role. If the ratio is too low, the glass network may be severely deteriorated and glass may be extremely hard to form. However, if the ratio is too high, the chemical toughening performance of the glass may be impaired. In some embodiments, the ratio of the weight-proportion of the sum of $SiO_2$ and $Al_2O_3$ to the weight-proportion of alkali metal oxides in the glass is between 2 and 10, such as between 3 and 8 or between 4 and 7.

Alkaline earth oxides such as MgO, CaO, SrO, BaO work as the network modifier and decrease the forming temperature of glass. These oxides can be added to adjust the CTE and Young's modulus of glass. Alkaline earth oxides have an important function that they can change refractive index of the glass to meet special requirements. For example, MgO can decrease the refractive index of glass and BaO can increase the refractive index. The weight content of alkaline earth oxides may not be higher than 40 wt. %, such as not higher than 15 wt.-%, not higher than 13 wt.-%, or not higher than 12 wt.-%. If the amount of alkaline earth oxides is too high, chemical toughening performance may be deteriorated. Moreover, the crystallization tendency may be increased if the amount of alkaline earth oxides is too high.

Some transition metal oxides in glass, such as ZnO and $ZrO_2$, have similar function as alkaline earth oxides. Other transition metal oxides, such as $Nd_2O_3$, $Fe_2O_3$, CoO, NiO, $V_2O_5$, $MnO_2$, $TiO_2$, CuO, $CeO_2$, and $Cr_2O_3$, work as coloring agents to make glass with specific optical or photonic functions, for example, color filter or light convertor. $As_2O_3$, $Sb_2O_3$, $SnO_2$, $SO_3$, Cl and/or F can also be added as refining agents in an amount of from 0 to 2 wt. %. Rare earth oxides can also be added to add magnetic or photonic or optical functions to the glass sheet in an amount of 0 to 5 wt. %.

In one embodiment, the ultrathin flexible glass is alkali metal aluminosilicate glass comprising the following components in the indicated amounts (in wt. %):

| Component | (wt. %) |
| --- | --- |
| $SiO_2$ | 40-75 |
| $Al_2O_3$ | 10-30 |
| $B_2O_3$ | 0-20 |
| $Li_2O + Na_2O + K_2O$ | 4-30 |
| $MgO + CaO + SrO + BaO + ZnO$ | 0-15 |
| $TiO_2 + ZrO_2$ | 0-15 |
| $P_2O_5$ | 0-10 |

Optionally, coloring oxides such as $Nd_2O_3$, $Fe_2O_3$, CoO, NiO, $V_2O_5$, $MnO_2$, CuO, $CeO_2$, $Cr_2O_3$ can be added and/or $As_2O_3$, $Sb_2O_3$, $SnO_2$, $SO_3$, Cl and/or F can also be added as refining agents in an amount of from 0 to 2 wt. %. Rare earth oxides can also be added to add magnetic or photonic or optical functions to the glass sheet in an amount of 0 to 5 wt. %.

An exemplary alkali metal aluminosilicate glass may comprise the following components in the indicated amounts (in wt. %):

| Component | (wt. %) |
| --- | --- |
| $SiO_2$ | 50-70 |
| $Al_2O_3$ | 10-27 |
| $B_2O_3$ | 0-18 |
| $Li_2O + Na_2O + K_2O$ | 5-28 |
| $MgO + CaO + SrO + BaO + ZnO$ | 0-13 |
| $TiO_2 + ZrO_2$ | 0-13 |
| $P_2O_5$ | 0-9 |

Optionally, coloring oxides can be added, such as $Nd_2O_3$, $Fe_2O_3$, CoO, NiO, $V_2O_5$, $MnO_2$, CuO, $CeO_2$, and/or $Cr_2O_3$. 0-2 wt. % of $As_2O_3$, $Sb_2O_3$, $SnO_2$, $SO_3$, Cl and/or F can be also added as refining agents. 0-5 wt. % of rare earth oxides can also be added to add magnetic or photonic or optical functions to the glass sheet.

In some embodiments, the alkali metal aluminosilicate glass comprises the following components in the indicated amounts (in wt. %):

| Components | (wt. %) |
| --- | --- |
| $SiO_2$ | 55-68 |
| $Al_2O_3$ | 10-27 |
| $B_2O_3$ | 0-15 |
| $Li_2O + Na_2O + K_2O$ | 4-27 |
| $MgO + CaO + SrO + BaO + ZnO$ | 0-12 |
| $TiO_2 + ZrO_2$ | 0-10 |
| $P_2O_5$ | 0-8 |

Optionally, coloring oxides can be added, such as $Nd_2O_3$, $Fe_2O_3$, CoO, NiO, $V_2O_5$, $MnO_2$, CuO, $CeO_2$, and/or $Cr_2O_3$. 0-2 wt. % of $As_2O_3$, $Sb_2O_3$, $SnO_2$, $SO_3$, Cl and/or F can be also added as refining agents. 0-5 wt. % of rare earth oxides can also be added to add magnetic or photonic or optical functions to the glass sheet.

In some embodiments, the ultrathin flexible glass is soda lime glass comprising the following components in the indicated amounts (in wt. %):

| Component | (wt. %) |
| --- | --- |
| $SiO_2$ | 40-81 |
| $Al_2O_3$ | 0-10 |
| $B_2O_3$ | 0-5 |
| $Li_2O + Na_2O + K_2O$ | 5-30 |
| $MgO + CaO + SrO + BaO + ZnO$ | 5-30 |
| $TiO_2 + ZrO_2$ | 0-7 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, and/or $Cr_2O_3$. 0-2 wt. % of $As_2O_3$, $Sb_2O_3$, $SnO_2$, $SO_3$, Cl and/or F can be also added as refining agents. 0-5 wt. % of rare earth oxides can also be added to add magnetic or photonic or optical functions to the glass sheet.

The soda lime glass can comprise the following components in the indicated amounts (in wt. %):

| Component | (wt. %) |
| --- | --- |
| $SiO_2$ | 40-81 |
| $Al_2O_3$ | 0-6 |
| $B_2O_3$ | 0-5 |
| $Li_2O + Na_2O + K_2O$ | 5-30 |
| $MgO + CaO + SrO + BaO + ZnO$ | 5-30 |
| $TiO_2 + ZrO_2$ | 0-7 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, and/or $Cr_2O_3$. 0-2 wt. % of $As_2O_3$, $Sb_2O_3$, $SnO_2$, $SO_3$, Cl and/or F can be also added as refining agents. 0-5 wt. % of rare earth oxides can also be added to add magnetic or photonic or optical functions to the glass sheet.

The soda lime glass can comprise the following components in the indicated amounts (in wt. %):

| Component | (wt. %) |
| --- | --- |
| $SiO_2$ | 50-81 |
| $Al_2O_3$ | 0-8 |
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, and/or $Cr_2O_3$. 0-2 wt. % of $As_2O_3$, $Sb_2O_3$, $SnO_2$, $SO_3$, Cl and/or F can be also added as refining agents. 0-5 wt. % of rare earth oxides can also be added to add magnetic or photonic or optical functions to the glass sheet.

The soda lime glass can comprise the following components in the indicated amounts (in wt. %):

| Component | (wt. %) |
| --- | --- |
| $SiO_2$ | 50-81 |
| $Al_2O_3$ | 0-5 |
| $B_2O_3$ | 0-5 |
| $Li_2O + Na_2O + K_2O$ | 5-28 |
| $MgO + CaO + SrO + BaO + ZnO$ | 5-25 |
| $TiO_2 + ZrO_2$ | 0-6 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, and/or $Cr_2O_3$. 0-2 wt. % of $As_2O_3$, $Sb_2O_3$, $SnO_2$, $SO_3$, Cl and/or F can be also added as refining agents. 0-5 wt. % of rare earth oxides can also be added to add magnetic or photonic or optical functions to the glass sheet.

In some embodiments, the soda lime glass comprises the following components in the indicated amounts (in wt. %):

| Component | (wt. %) |
| --- | --- |
| $SiO_2$ | 55-76 |
| $Al_2O_3$ | 0-6 |
| $B_2O_3$ | 0-5 |
| $Li_2O + Na_2O + K_2O$ | 5-25 |
| $MgO + CaO + SrO + BaO + ZnO$ | 5-20 |
| $TiO_2 + ZrO_2$ | 0-5 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, and/or $Cr_2O_3$. 0-2 wt. % of $As_2O_3$, $Sb_2O_3$, $SnO_2$, $SO_3$, Cl and/or F can be also added as refining agents. 0-5 wt. % of rare earth oxides can also be added to add magnetic or photonic or optical functions to the glass sheet.

In some embodiments, the soda lime glass comprises the following components in the indicated amounts (in wt. %):

| Component | (wt. %) |
| --- | --- |
| $SiO_2$ | 55-76 |
| $Al_2O_3$ | 0-5 |
| $B_2O_3$ | 0-5 |
| $Li_2O + Na_2O + K_2O$ | 5-25 |
| $MgO + CaO + SrO + BaO + ZnO$ | 5-20 |
| $TiO_2 + ZrO_2$ | 0-5 |
| $P_2O_5$ | 0-2 |

Optionally, coloring oxides can be added, such as $Nd_2O_3$, $Fe_2O_3$, CoO, NiO, $V_2O_5$, $MnO_2$, CuO, $CeO_2$, and/or $Cr_2O_3$. 0-2 wt. % of $As_2O_3$, $Sb_2O_3$, $SnO_2$, $SO_3$, Cl and/or F can be also added as refining agents. 0-5 wt. % of rare earth oxides can also be added to add magnetic or photonic or optical functions to the glass sheet.

Typically, ultrathin glass with high $T_4$ and CTE can be produced by polishing down or etching from thicker glass. These two methods are not economical and lead to bad surface quality, which is quantified by $R_a$ roughness and waviness and large TTV.

Direct hot-forming production like down draw, overflow fusion method are practical for mass production. They are economical and the glass surface quality is high and the ultrathin glass with thickness from 10 μm to 500 μm can be produced. For example, the down-draw/overflow fusion method can make a pristine or fire-polished surface with roughness $R_a$ less than 5 nm, such as less than 2 nm or less than 1 nm. The thickness can also be precisely controlled ranging from 10 μm and 500 μm. The thin thickness grants the glass flexibility. Special float can produce ultrathin glass with a pristine surface; it is economical and suitable for mass production too, but the glass produced by float has one side as a tin-side which is different from the other side. The difference between the two sides could cause warp issue of the glass after chemical toughening, and affect printing or coating processes because the two sides have different surface energy.

The ultrathin glass can be produced and processed in the form of a sheet or roll. The sheet size may be larger than or equal to 100*100 $mm^2$, such as larger than 400*320 $mm^2$, larger than 470*370 $mm^2$, or larger than 550*440 $mm^2$. Ultrathin glass rolls may have a width larger than 250 mm, such as larger than 320 mm, larger than 370 mm, or larger than 440 mm. The length of glass for a glass roll may be longer than 1 m, such as 10 m, 100 m, or 500 m.

The strengthening, also called toughening, can be done by immersing glass into a melted salt bath with potassium ions or by covering the glass with potassium ions or other alkaline metal ions contained in a paste and heating at a high temperature for a certain time. The alkaline metal ions with larger ion radius in the salt bath or the paste exchange with alkaline metal ions with smaller radius in the glass, and surface compressive stress is formed due to ion exchange.

A chemically toughened glass article may be obtained by chemically toughening the chemically toughenable glass article described herein. The toughening process can be done by immersing the ultrathin glass article into a salt bath which contains monovalent ions to exchange with alkali ions inside glass. The monovalent ions in the salt bath have a radius larger than alkali ions inside the glass. A compressive stress in the glass is built up after ion-exchange due to larger ions squeezing in the glass network. After the ion-exchange, the strength and flexibility of the ultrathin glass are surprisingly and significantly improved. In addition, the CS induced by chemical toughening can increase scratch resistance of the glass so that toughened glass is not scratched easily, and the DoL can increase the scratch tolerance such that the glass is less likely broken or scratched.

The most used salt for chemical toughening is $Na^+$-containing or $K^+$-containing melted salt, or a mixture thereof. Commonly used salts are $NaNO_3$, $KNO_3$, NaCl, KCl, $K_2SO_4$, $Na_2SO_4$, $Na_2CO_3$, and $K_2CO_3$. Additives like NaOH, KOH and other sodium salt or potassium salt can also be used for better controlling the speed of ion-exchange, CS and DoL during chemical toughening. $Ag^+$-containing or $Cu^{2+}$-containing salt bath can be used to add anti-microbial function to the ultrathin glass.

The chemical toughening is not limited to a single step; it can include multi steps in a salt bath with alkaline metal ions of various concentrations to reach better toughening performance.

Glass rolls can be chemical toughened with online roll to roll or roll to sheet processes. During this process, ultrathin glass is fed into a chemical strengthening bath and afterwards again rolled or cut to sheet. The glass roll can also be fed after the chemical toughening directly into a cleaning bath line and then rolled again or cut to sheet.

After toughening, the ultrathin glass should have high enough CS and DoL to achieve high strength. In some embodiments, CS is at least 500 MPa, such as at least 600 MPa, more than 700 MPa, at least 710 MPa, at least 720 MPa, at least 750 MPa, or at least 800 MPa. DoL may be at least 5 μm, such as at least 8 μm, or at least 10 μm.

CS mostly depends on the composition of glass. Higher $Al_2O_3$ content, which in turn leads to high $T_4$, is helpful to achieve higher CS. To reach balanced glass hot-forming capability and chemical toughening performance, CS may be below 1200 MPa.

DoL also depends on glass composition, but it can increase nearly infinitely with increased toughening time. High enough DoL is essential to ensure the stable strength of toughened glass, but too high a DoL increases the self-breakage ratio and the strength performance when the ultrathin glass article is under compressive stress, so DoL may be controlled to be less than 50 μm, such as less than 40 μm, less than 30 μm, or less than 25 μm.

On the other hand, it has been surprisingly found that toughened ultrathin glass can tolerate much higher CT than thicker glass without self-breakage. In some embodiments, CT is at least 50 MPa, such as at least 100 MPa, at least 120 MPa, at least 150 MPa, at least 160 MPa, at least 170 MPa, at least 200 MPa, at least 300 MPa, or at least 500 MPa. In some embodiments, 70 μm thick ultrathin glass is toughened to get CS of 720 MPa and DoL of 25 μm, and the resultant CT is as high as 900 MPa, thus even higher than CS. Such surprising high CT is not described in the prior art and the central tension over compressive stress ratio may be in the range of 0.05-2.0, such as in the range of 0.1-1.8, in the range of 0.15-1.7, in the range of 0.2-1.6, or in the range of 0.3-1.5.

The chemical toughening performance of the glass can be described by the threshold diffusivity D. The threshold diffusivity D can be calculated from the measured depth of layer (DoL) and the ion exchange time (IET) according to the relationship: DoL=~1.4 sqrt (4*D*IET). The glass disclosed herein has excellent chemical toughening performance. Thus, the glass has a threshold diffusivity D of at least 1.5 μm²/hour. In some embodiments, the glass has a threshold diffusivity D of at least 4 μm₂/hour, such as at least 6 μm₂/hour, at least 8 μm²/hour, at least 10 μm²/hour, at least 12 μm²/hour, at least 14 μm²/hour, at least 16 μm₂/hour, at least 18 μm²/hour, at least 20 μm²/hour, at least 25 μm²/hour, at least 30 μm²/hour, at least 35 μm²/hour, or at least 40 μm²/hour.

In addition to the threshold diffusivity D, also the compressive stress susceptibility CSS is an important parameter with regard to the chemical toughening performance. The CSS value indicates the compressive stress CS that can be achieved upon chemical toughening. The CSS is mainly dependent on the glass composition and on the thermal history of the glass. In particular, a low cooling rate is associated with a high CSS and vice versa. In the present disclosure, the CSS value is indicated for chemical toughening in a pure KNO₃ salt bath at 420° C. for 2 hours. In some embodiments, the CSS of the glass articles determined under the indicated conditions is at least 450 MPa, such as at least 500 MPa, at least 550 MPa, or at least 600 MPa.

In some embodiments, chemical toughening includes fast heating and quenching processing, and thermal shocking is inevitable during this process. Chemical toughening salt baths are usually heated to higher than 350° C., or even up to 700° C., to produce the melted salt bath. When immersing ultrathin glass into the salt bath, there is a temperature gradient between the glass and salt bath, and the gradient inside one single piece of glass when part of the glass is immersed into the salt bath. On the other hand, when taking ultrathin glass out of the salt bath, it is usually a fast quenching process. Due to the low thickness, ultrathin glass is more prone to break in the same temperature gradient. These thermal shock processes therefore result in low yield when toughening ultrathin glass without a specially designed composition. Although preheating and post-annealing can reduce the temperature gradient, they are time and energy consuming processes. The maximum temperature gradient glass can withstand increases with thermal shock resistance, even during preheating and post-annealing processes. Therefore, high thermal shock resistance is useful for ultrathin glass to simplify the chemical toughening process and improve yield. In addition to the chemical toughening process, thermal stress can also be introduced in post processing after chemical toughening, laser cutting process or thermal cutting processes.

From the foregoing, it should be appreciated that the thermal shock resistance of raw glass before chemical toughening is an especially important factor for the flexible ultrathin glass, because the thermal shocking resistance determines economical availability of said toughened glass with high quality. This is also why the composition of the raw glass sheet is carefully designed for each type of glass, which has been previously described.

The robustness of a material to thermal shock is characterized with the thermal shock parameter:

$$R = \frac{\sigma(1-\mu)\lambda}{E\alpha}$$

Where R is the thermal shock resistance; α is CTE; σ is the strength of materials; E is the Young's modulus; λ is the thermal conductivity; and μ is Poisson ratio. Higher values for R represent greater resistance to thermal shock and high tolerance to temperature gradient and thermal loading. Accordingly, thermal stress resistance for glass is determined by maximum thermal loading ΔT from the following equation:

$$\Delta T = \frac{2\sigma(1-\mu)}{E\alpha}$$

Glass with higher R has higher thermal loading tolerance and hence has greater resistance to thermal shock. Therefore, before chemical toughening, R may be higher than 100 W/m², such as higher than 120 W/m², or higher than 150 W/m². Before chemical toughening, ΔT may be higher than 200° C., higher than 250° C., or higher than 300° C.

It has been surprisingly found the ultrathin glass can have improved thermal shock resistance after chemical strengthening, as indicated by the thermal shock resistance and maximum thermal loading shown in Table 2 for the chemically toughened examples.

For the practical applications, R of chemically toughened glass may be higher than 190 W/m², such as higher than 250 W/m², higher than 300 W/m², higher than 500 W/m², or higher than 800 W/m².

ΔT of chemically toughened glass may be higher than 380° C., such as higher than 500° C., higher than 600° C., higher than 1000° C., higher than 1500° C., or higher than 2000° C.

The actual thermal shock resistance of a glass article with defined dimensions can be quantified by the resistance to temperature gradient (RTG), which can be measured by an experiment conducted as follows: a glass sample is made of size 250*250 mm² to test the resistance to temperature gradient. The samples are heated in the center of the panel to a defined temperature, and the edges are maintained at room temperature. The gradient in temperature between the hot center of the panel and the cool panel edge represents the resistance to temperature gradient of glass when the breakage occurs to less than or equal to 5% of the samples. It has been surprisingly found that the ultrathin glass has improving thermal shock resistance RTG with decreasing thickness. For the application of ultrathin glass, RTG may be higher than 50 K, such as higher than 100 K, higher than 150 K, or higher than 200 K.

Another experiment to test resistance to thermal shock (RTS) may be conducted as follows. Glass samples made of size 200*200 mm² are heated in an oven with circulating air and afterwards are doused in the center with 50 mL of cold (room temperature) water. The resistance to thermal shock value is the difference in temperature between the hot panel and the cold (room temperature) water, at which breakage occurs to less than or equal to 5% of the samples. For the application of ultrathin glass, RTS may be higher than 75 K, such as higher than 115 K, higher than 150 K, or higher than 200 K.

R is calculated to evaluate the thermal shock resistance of glass without thermal shock experiment, and the accordance with experimental data is generally good. However, the thermal shocking resistance of glass will also be affected by other factors, e.g. the shape of the sample, the thickness and processing history. The RTS is an experimental result which measures a specific thermal shock resistance of glass in a given condition. R concerns the property of glass material, while RTS includes other factors in practical application. RTS is proportional to R when other condition is the same for glass.

$\Delta T$ is calculated from intrinsic parameters like R to evaluate the temperature gradient resistance of glass material without temperature difference experiment, and the accordance with experimental data is also generally good. However, the resistance to temperature difference is also highly dependent on the specific conditions such as the size of glass sample, thickness of glass, and processing history of glass. The RTG is an experimental result showing the specific resistance to temperature difference of glass for a given condition. $\Delta T$ concerns the property of glass material, while RTG includes other factors in practical application. RTG is proportional to $\Delta T$, but not necessarily equal to each other.

The materials strength would also affect the resistance of thermal shock, because the breakage due to thermal stress only happens when the induced thermal stress exceeds the material strength.

The glass articles can be used, for example, in the following application fields of display substrate or protection cover, finger print sensors cover, general sensor substrate or cover, cover glass of consumer electronics, protective covers of displays and other surfaces, such as bended surfaces. Moreover, the glass articles may also be used in the applications of display substrate and cover, fingerprint sensor module substrate or cover, semiconductor package, thin film battery substrate and cover. In some embodiments, the glass articles may be used as cover film for resistance screens, and expendable protective films for display screens, cell phones, cameras, gaming gadgets, tablets, laptops, TVs, mirrors, windows, aviation widows, furniture, and white goods.

The glass articles can be additionally coated for e.g. anti-reflection, anti-scratch, anti-fingerprint, anti-microbial, anti-glare and combinations of these functions.

A method of producing a glass article is also provided, the method comprising the following steps:
 a) Providing a composition of raw materials for the desired glass,
 b) Melting the composition,
 c) Producing a glass article in a flat glass process, and
 d) Optionally coating at least one surface of the article with a coating layer,
wherein the melt is cooled in the flat glass process from a temperature $T_a$ being 100° C. above a transition temperature of the glass $T_g$ to a temperature $T_b$ being 50° C. below $T_g$ in such a way that the product of the average cooling rate C between $T_a$ and $T_b$ on the one hand and the thickness t of the glass article on the other hand is less than 300 mm° C./min.

To overcome the difficulty of combined high $T_4$ and high CTE in the hot-forming of flat ultrathin glass, a comparably slow cooling rate is required. If the glass is cooled too fast, the glass may develop tensions and even deformations up to breakage. Comparably slow cooling is therefore also essential in order to obtain glass articles with small TTV. If the glass is cooled too fast, the small TTV cannot be obtained. However, glass belt in ultrathin form means a fast moving speed of ultrathin glass belt. To reduce the cooling rate from $T_4$ to room temperature, the glass hot-forming line would have to be prolonged in such a way that this is not realistic any more. It has been surprisingly found that the cooling rate from $T_a$ (equal to $T_g+100°$ C.) to $T_b$ (equal to $T_g-50°$ C.) is much more critical than the cooling rate in other temperature range. If the cooling rate between $T_a$ and $T_b$ can be reduced significantly, the cooling rate in other temperature ranges does not need special care. Further, since $T_a$ to $T_b$ is only a small temperature range, the cooling rate in this range can be reduced without expanding the entire hot-forming line, i.e. by placing additional heating devices when the glass belt goes through this temperature range, although the cooling rate in other temperature ranges may increase.

It has been found that the desired cooling rate between $T_a$ and $T_b$ is strongly dependent on the thickness of the glass article. In fact, the lower the thickness of the glass article, the higher the cooling rate C may be. Therefore, useful cooling conditions are indicated as the product of the average cooling rate C between $T_a$ and $T_b$ on the one hand and the thickness t of the glass article on the other hand. It has been surprisingly found that a comparably low cooling rate also leads to higher compressive stress CS after chemical toughening. This is helpful for toughened glass to achieve higher strength. This is important for ultrathin glasses because such glasses cannot compensate low CS by an increase in DoL, in contrast to thicker glasses, due to the limitations imposed on DoL by the low thickness of the glasses. Thus, a comparably low cooling rate is also useful for achieving an increased CS. In some embodiments, the product of the average cooling rate C between $T_a$ and $T_b$ on the one hand and the thickness t of the glass article on the other hand is less than 280 mm° C./min, such as less than 260 mm° C./min. However, the glass should also not be cooled too slowly because otherwise crystallization may occur. Moreover, too slow of cooling is also associated with a decrease of chemical toughening performance because too slow cooling increases the density of the glass network, which in turn leads to a decrease in threshold diffusivity D. Therefore, the product of the average cooling rate C between $T_a$ and $T_b$ on the one hand and the thickness t of the glass article on the other hand may be higher than 100 mm° C./min, such as higher than 150 mm° C./min, or at least 200 mm° C./min.

It has been surprisingly found that there is a certain relationship among $T_4$, CTE, the cooling rate C between $T_a$ and $T_b$, and the glass thickness t for such ultrathin glass hot forming. $T_4 \cdot CTE \cdot \ln(C \cdot t)$ may be in the range of 40000-80000*10⁻⁶ ln (mm° C./min), such as in the range of 45000-75000*10⁻⁶ ln (mm° C./min), in the range of 50000-68000*10⁻⁶ ln (mm° C./min), or in the range of 52000-66000*10⁻⁶ ln (mm° C./min); such ultrathin glass with combined high $T_4$ and high CTE can be directly hot-formed to get the ultrathin glass article having excellent chemical toughening performance and small TTV.

After applying such slow cooling rate, the ultrathin glass has small residual stress due to cooling from high temperature. The ultrathin glass is more sensitive to residual stress than thicker glass, since the deformation of glass is inversely proportional to the $3^{rd}$ potential of glass thickness. Therefore, the residual stress for a glass having a thickness of about 50 μm may be less than 50 MPa, such as less than 30 MPa or less than 10 MPa.

It has been surprisingly found that lower cooling rate C leads to higher compressive stress after toughening. This is helpful for toughened glass to achieve higher strength. Although this higher compressive stress is obtained with the compromise of lower DoL, toughened ultrathin glass does not need as high DoL as thick glass. Furthermore, DoL can be easily increased by prolonged toughening time and temperature, but compressive stress is mostly dependent on glass composition and thermal history.

Table 1 shows the comparison samples (1-3) and several exemplary embodiments (4-16) of direct hot-forming ultrathin glasses which are chemically toughenable. Table 2 shows the properties of these samples after chemically strengthened in $KNO_3$ salt bath at 420° C. for 2 hours.

TABLE 1

| Example No. | 1 | 2 | 3 | 4 | 5 | 6 | 7 | 8 |
|---|---|---|---|---|---|---|---|---|
| $SiO_2$ (wt %) | 72 | 63 | 69 | 72 | 74 | 72 | 69 | 60 |
| $Na_2O$ (wt %) | 9 | | 10 | 11 | 13 | 13 | 14 | 13 |
| CaO (wt %) | 2 | 5 | 6 | 13 | 5 | 0 | 0 | 0 |
| $Al_2O_3$ (wt %) | 4 | 17 | | 2 | 7 | 12 | 16 | 17 |
| $K_2O$ (wt %) | | | 7 | 0 | 1 | 1 | 0 | 4 |
| MgO (wt %) | | 4 | 1 | 2 | 0 | 0 | 1 | 4 |
| $ZrO_2$ (wt %) | | | | 0 | 0 | 0 | 0 | 2 |
| $B_2O_3$ (wt %) | 4 | 10 | | 0 | 0 | 0 | 0 | 0 |
| $TiO_2$ (wt %) | 4 | 1 | 3 | | | 1 | | |
| ZnO (wt %) | 5 | | 4 | | | 1 | | |
| $P_2O_5$ (wt %) | | | | | | | | 1 |
| Sum (wt %) | 100 | 100 | 100 | 100 | 100 | 100 | 100 | 100 |
| E (GPa) | 73 | 74 | 71 | 74 | 71 | 72 | 73 | 74 |
| $T_g$ (° C.) | 553 | 721 | 505 | 510 | 552 | 643 | 666 | 629 |
| $T_4$ (° C.) | 1060 | 1310 | 1027 | 1025 | 1102 | 1228 | 1367 | 1265 |
| CTE (×$10^{-6}$) | 7.6 | 3.3 | 9.3 | 9.6 | 8.0 | 7.2 | 7.4 | 8.7 |
| Density (g/cm2) | 2.51 | 2.42 | 2.52 | 2.51 | 2.49 | 2.46 | 2.45 | 2.48 |
| C (° C./min) | 1500 | 2000 | 400 | 1180 | 1400 | 1260 | 660 | 2500 |
| C*t (mm ° C./min) | 315 | 200 | 280 | 236 | 210 | 189 | 198 | 175 |
| $T_4$*CTE ($10^{-6}$) | 8056 | 4323 | 9551 | 9835 | 8827 | 8861 | 10104 | 11006 |
| $T_4$*CTE*ln(C*t) ($10^{-6}$ · ln(mm ° C./min) | 46343 | 22905 | 53818 | 53739 | 47200 | 46446 | 53433 | 56841 |
| Inverse Stiffness ((s/mm)$^2$) | 0.0344 | 0.0327 | 0.0355 | 0.0339 | 0.0351 | 0.0342 | 0.0336 | 0.0335 |
| Thickness (mm) | 0.21 | 0.1 | 0.7 | 0.2 | 0.15 | 0.15 | 0.3 | 0.07 |
| R (W/m$^2$) | 172 | 519 | 143 | 136 | 191 | 215 | 193 | 217 |
| ΔT (K) | 337 | 894 | 260 | 264 | 357 | 390 | 347 | 388 |

| Example No. | 9 | 10 | 11 | 12 | 13 | 14 | 15 | 16 |
|---|---|---|---|---|---|---|---|---|
| $SiO_2$ (wt %) | 60 | 60 | 56 | 60 | 66 | 68 | 63 | 70 |
| $Na_2O$ (wt %) | 17 | 14 | 17 | 13 | 15 | 15 | 19 | 17 |
| CaO (wt %) | 0 | 0 | 0 | 0 | 0 | 0 | 0 | 0 |
| $Al_2O_3$ (wt %) | 17 | 20 | 20 | 20 | 11 | 7 | 11 | 6 |
| $K_2O$ (wt %) | 0 | 2 | 1 | 0 | 1 | 0 | 0 | 0 |
| MgO (wt %) | 4 | 4 | 4 | 2 | 3 | 3 | 4 | 4 |
| $ZrO_2$ (wt %) | 2 | 0 | 2 | 0 | 0 | 0 | 2 | 2 |
| $B_2O_3$ (wt %) | 0 | 0 | 0 | 5 | 4 | 5 | 0 | 0 |
| $TiO_2$ (wt %) | | | | | | 1 | 1 | |
| ZnO (wt %) | | | | | | 1 | | 1 |
| $P_2O_5$ (wt %) | | | | | | | | |
| Sum (wt %) | 100 | 100 | 100 | 100 | 100 | 100 | 100 | 100 |
| E (GPa) | 73 | 74 | 75 | 68 | 70 | 71 | 74 | 72 |
| $T_g$ (° C.) | 649 | 679 | 648 | 628 | 609 | 581 | 620 | 556 |
| $T_4$ (° C.) | 1295 | 1378 | 1321 | 1305 | 1276 | 1233 | 1229 | 1212 |
| CTE (×$10^{-6}$) | 9.2 | 8.2 | 9.3 | 7.6 | 8.1 | 8.3 | 10.4 | 9.3 |
| Density (g/cm2) | 2.49 | 2.46 | 2.44 | 2.39 | 2.44 | 2.47 | 2.50 | 2.47 |
| C (° C./min) | 1660 | 760 | 800 | 660 | 1830 | 1200 | 560 | 880 |
| C*t (mm ° C./min) | 166 | 152 | 160 | 198 | 183 | 180 | 168 | 176 |
| $T_4$*CTE | 11859 | 11236 | 12339 | 9889 | 10351 | 10225 | 12817 | 11226 |
| $T_4$*CTE*ln(C*t) ($10^{-6}$ · ln(mm ° C./min) | 60623 | 56450 | 62621 | 52298 | 53923 | 53096 | 65672 | 58043 |
| Inverse Stiffness ((s/mm)$^2$) | 0.0341 | 0.0331 | 0.0325 | 0.0351 | 0.0349 | 0.0348 | 0.0340 | 0.0342 |
| Thickness (mm) | 0.1 | 0.2 | 0.2 | 0.3 | 0.1 | 0.15 | 0.3 | 0.2 |
| R (W/m$^2$) | 181 | 175 | 152 | 188 | 215 | 191 | 125 | 153 |
| ΔT (K) | 327 | 309 | 267 | 333 | 385 | 344 | 224 | 280 |

Exemplary embodiments of direct hot-forming ultrathin glass composition and properties of as formed glasses. Examples 1 to 3 are comparative examples and Examples 4-16 are glasses formed according to the present disclosure.

TABLE 2

| Sample No. | 1 | 2 | 3 | 4 | 5 | 6 | 7 | 8 |
|---|---|---|---|---|---|---|---|---|
| CS (MPa) | 260 | N/A | 365 | 547 | 650 | 710 | 865 | 770 |
| DoL (μm) | 8 | N/A | 8 | 5 | 9 | 18 | 23 | 27 |
| CT/CS | 0.065 | | 0.011 | 0.024 | 0.070 | 0.163 | 0.091 | 1.573 |
| CT (MPa) | 17 | | 4 | 13 | 46 | 116 | 79 | 1211 |
| R (W/m$^2$) | 459 | | 546 | 686 | 1049 | 1280 | 1485 | 1153 |
| ΔT (K) | 900 | | 992 | 1333 | 1962 | 2327 | 2675 | 2060 |

| Sample No. | 9 | 10 | 11 | 12 | 13 | 14 | 15 | 16 |
|---|---|---|---|---|---|---|---|---|
| CS (MPa) | 820 | 956 | 880 | 757 | 620 | 550 | 730 | 630 |
| DoL (um) | 21 | 27 | 28 | 26 | 17 | 8 | 19 | 11 |
| CT/CS | 0.373 | 0.186 | 0.192 | 0.105 | 0.252 | 0.060 | 0.073 | 0.062 |
| CT (MPa) | 306 | 178 | 169 | 79 | 156 | 33 | 53 | 39 |
| R (W/m$^2$) | 1153 | 1480 | 1193 | 1389 | 1062 | 904 | 895 | 877 |
| ΔT (K) | 2077 | 2620 | 2093 | 2458 | 1896 | 1629 | 1597 | 1609 |

Properties of chemically toughened samples in Table 1 (toughened in pure KNO$_3$ salt bath at 420° C. for 2 hours)

Examples 1-3 in Table 1 are comparative examples of ultrathin glass compositions with relatively low $T_4$ or/and CTE and inadequate toughening performance. These glasses can be produced relatively easily through direct hot-forming method without special care of C.

The CTE of example 1 is 7.6 due to low alkaline metal content, and the chemical toughening performance is not very good due to slow ion exchange rate. It only reaches CS of 260 MPa and DoL of 8 μm after toughening at 420° C. for 2 hours.

Example 2 is an alkaline free glass with high content of Al$_2$O$_3$, so $T_4$ is high, while the low content of alkaline metal and fair amount of B$_2$O$_3$ ensure the low CTE and facilitate direct hot-forming production. It cannot be chemical strengthened due to no alkaline metal ions being included.

Example 3 is a soda-lime glass with a relatively high content of alkaline metal and alkaline earth metal oxides. Although the glass has relatively high $T_4$*CTE due to very high CTE, and C should be reduced to ease the hot-forming process. However, due to low Al$_2$O$_3$ content, $T_4$ itself is still low and the chemical toughening performance is not very good.

In example 4, another composition in a soda-lime system, slight addition of Al$_2$O$_3$ and increased amount of Na$_2$O compared with example 3 leads to higher CS, although DoL is still not high.

In example 5, half of CaO in example 4 is replaced by Al$_2$O$_3$, $T_4$ is increased to over 1100° C. Chemical toughening performance is also improved.

In example 6, all CaO in example 4 is replaced by Al$_2$O$_3$, $T_4$ is further increased to over 1200° C. CTE decreases with increasing Al$_2$O$_3$ since AlO$_4$ is also a glass network former, while CaO is a pure network modifier. A slower C*t of 189 mm° C./min is applied to ensure the production of ultrathin glass with low residual stress. Once again, chemical toughening performance is significantly improved with both higher CS and DoL.

In example 7, Al$_2$O$_3$ content is increased further by reducing the content of SiO$_2$, and chemical toughening performance is improved further. However, such high content of Al$_2$O$_3$ also leads to extremely high $T_4$ over 1350° C. and also extremely high melting temperature. The melting of such glass will reduce the lifetime of melting tank.

In example 8, K$_2$O and MgO are introduced to lower the melting point. As a network modifier, MgO does not have the negative influence on chemical toughening performance as CaO. Furthermore, in alkaline metal aluminosilicate glass, moderate K$_2$O content can help to increase DoL without reducing CS. ZrO$_2$ can help to increase the hardness of glass. $T_4$ of example 8 is controlled slightly higher than 1250° C., and CTE is no more than 9. A slower C*t of 175 mm° C./min is applied to ensure the production of ultrathin glass with low residual stress. DoL of example 8 can reach 27 μm after toughening at 420° C. for 2 h, and CS is close to 800 MPa, even through the thickness is only 0.07 mm.

In example 9, K$_2$O in example 8 has been replaced by Na$_2$O. As expected, CS increase while DoL decrease. Both $T_4$ and CTE increase because there is no mixed alkaline effect anymore. A C*t of 166 mm° C./min is applied to ensure the production of ultrathin glass with low residual stress. The C*t is not very low because the CTE of example 9 is very high.

In example 10, K$_2$O in example 8 is reduced to half and Al$_2$O$_3$ is further increased. The chemical toughening performance is very good with extremely good CS and DoL. However, the extremely high Al$_2$O$_3$ content and the resultant high $T_4$ also needs an extremely slow C*t of 152 mm° C./min applied to ensure the production of ultrathin glass with low residual stress.

In example 11, SiO$_2$ content in example 9 is reduced and mostly replaced by Al$_2$O$_3$, increases of both $T_4$ and CTE are observed. Very small C*t of 160 mm° C./min is applied to ensure the production of ultrathin glass with low residual stress. DoL reaches 28 μm after toughening at 420° C. for 2 h.

In example 12, Na$_2$O, MgO and ZrO$_2$ in example 11 are partially or fully replaced by SiO$_2$ and B$_2$O$_3$. CTE is largely reduced compared to example 11 due to introduction of B$_2$O$_3$. $T_4$*CTE is also reduced, although there is a slight increase of $T_4$. Higher C*t of 198 mm° C./min is used because of smaller $T_4$*CTE than example 11. However, introduction of B$_2$O$_3$ also significantly reduces CS, although DoL is not significantly influenced.

In example 13, Al$_2$O$_3$ content is significantly reduced, with the increase of SiO$_2$ and Na$_2$O, compared with example 12. $T_4$ is reduced a little, and CTE does not change very much because the balanced influence from increased Na$_2$O. Chemical toughening performance is significantly reduced due to less Al$_2$O$_3$.

In example 14, $Al_2O_3$ is further reduced. $T_4$ is also reduced, but it is still relatively higher than 1230° C. due to fair content of $B_2O_3$. Accordingly, chemical toughening performance is significantly impaired.

In example 15, $B_2O_3$ in example 13 is removed, with increased $Na_2O$ and $ZrO_2$. $T_4$ is reduced to slightly higher than 1200° C., but CTE significantly increases over $10*10^{-6}$. DoL increases significantly, compared to example 13, due to the removal of $B_2O_3$. Very slow C*t of 168 mm° C./min is applied to ensure the production of ultrathin glass with low residual stress due to very high $T_4$*CTE.

In example 16, $Al_2O_3$ in example 9 is partially replaced by $SiO_2$. $T_4$ decreases over 80° C. due to the reduced $Al_2O_3$, while CTE is not significantly changed because the total content of glass network formers does not change very much. A higher cooling rate can be used to obtain the glass with same residual stress. Accordingly, chemical toughening performance is significantly influenced by reduced $Al_2O_3$ content.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An article, comprising:
   a chemically toughenable glass having a thickness less than or equal to 100 μm, the glass having a working point $T_4$ of more than 1100° C. and the glass in the temperature range between 25° C. and 300° C. has an average linear thermal expansion coefficient CTE of more than $6*10^{-6}$/° C., the glass having a threshold diffusivity D of at least 14 μm²/hour, the glass having a total thickness variation (TTV) in an area of 0.4 m*0.5 m of:
      less than 20% of the thickness when the thickness is between 50 μm and 100 μm; or
      at most 10 μm when the thickness is less than 50 μm;
   wherein the glass comprises the following components in the indicated amounts (in wt. %):
   $SiO_2$ 40-75;
   $Al_2O_3$ 10-30;
   $B_2O_3$ 0-20;
   $Li_2O+Na_2O+K_2O$ 4-30;
   $MgO+CaO+SrO+BaO+ZnO$ 0-15;
   $TiO_2+ZrO_2$ 0-15; and
   $P_2O_5$ 0-10.

2. The article according to claim 1, wherein the glass has a working point $T_4$ lower than 1350° C.

3. The article according to claim 1, wherein the CTE is higher than $7*10^{-6}$/° C.

4. The article according to claim 1, wherein a hot-forming difficulty coefficient of the glass, defined by $T_4$*CTE, is in the range of $8060*10^{-6}$ to $14000*10^{-6}$.

5. The article according to claim 1, wherein an inverse stiffness of the glass is in the range of 0.032 to 0.0355 (s/mm)².

6. The article according to claim 1, wherein a compressive stress susceptibility CSS of the glass is at least 450 MPa.

7. The article according to claim 1, wherein the glass has a TTV in the area of 0.4 m*0.5 m of:
   less than 7.5% of the thickness when the thickness is between 67 μm and 100 μm; or
   at most 5 μm when the thickness is less than 67 μm.

8. The article according to claim 1, wherein the glass comprises the following components in the indicated amounts (in wt. %):
   $SiO_2$ 50-70;
   $Al_2O_3$ 10-27;
   $B_2O_3$ 0-18;
   $Li_2O+Na_2O+K_2O$ 5-28;
   $MgO+CaO+SrO+BaO+ZnO$ 0-13;
   $TiO_2+ZrO_2$ 0-13; and
   $P_2O_5$ 0-9.

9. The article according to claim 1, wherein the glass has a surface roughness $R_a$ of less than 5 nm.

10. The article according to claim 1, wherein the glass is coated or surface modified to achieve the function of at least one of: anti-reflection, anti-scratch, anti-fingerprint, anti-microbial, anti-glare or a combination thereof.

11. The article according to claim 1, wherein the glass comprises the following components in the indicated amounts (in wt. %):

| Component | (wt. %) |
|---|---|
| $SiO_2$ | 40-75; |
| $Al_2O_3$ | 10-30; |
| $B_2O_3$ | 0-20; |
| $Li_2O + Na_2O + K_2O$ | 4-30; |
| $MgO + CaO + SrO + BaO + ZnO$ | 0-15; |
| $TiO_2 + ZrO_2$ | 0-15; |
| $P_2O_5$ | 0-10; and |
| $K_2O$ | 0-4. |

12. The article of claim 1, wherein the thickness of the glass is less than 100 μm and the TTV is at most 10 μm.

13. A method of producing a glass article comprising a chemically toughenable glass, the method comprising:
   providing a composition of raw materials for the glass;
   melting the composition to form a melt; and
   producing the glass article, wherein a thickness t of the glass article is less than or equal to 100 μm, the glass having a working point $T_4$ of more than 1100° C. and the glass in the temperature range between 25° C. and 300° C. has an average linear thermal expansion coefficient CTE of more than $6*10^{-6}$/° C., the glass having a threshold diffusivity D of at least 1.5 μm²/hour, the glass having a total thickness variation (TTV) in an area of 0.4 m*0.5 m of:
   less than 20% of the thickness when the thickness is between 50 μm and 100 μm; or
   at most 10 μm when the thickness is less than 50 μm;
      wherein the glass is produced in a flat glass process and the producing comprises cooling the melt from a temperature $T_a$ being 100° C. above a transition temperature of the glass $T_g$ to a temperature $T_b$ being 50° C. below $T_g$ in such a way that the product of an average cooling rate C between $T_a$ and $T_b$ and the thickness is more than 100 mm° C./min and less than 300 mm° C./min.

14. The method according to claim 13, wherein $T_4$*CTE*ln(C*t) is in the range of $40000*10^{-6}$ to $80000*10^{-6}$ ln (mm° C./min).

15. The method according to claim 13, wherein the product of the average cooling rate C between $T_a$ and $T_b$ and the thickness t of the glass article is more than 100 mm° C./min and less than 280 mm° C./min.

16. The method according to claim 13, further comprising coating at least one surface of the glass article with a coating layer.

17. The method according to claim 13, wherein the flat glass process is a down draw process.

18. The method according to claim 13, further comprising chemically toughening the glass.

19. The method according to claim 18, wherein the chemical toughening comprises an ion-exchange process.

20. The method according to claim 19, wherein the ion-exchange process comprises immersing the glass article or a part of the glass article into a salt bath containing monovalent cations.

21. The method according to claim 20, wherein the monovalent cations are potassium ions.

22. The method according to claim 20, wherein the glass article or a part of the glass article is immersed in the salt bath at a temperature between 350° C. to 700° C. for 5 minutes to 48 hours.

23. The method of claim 13, wherein the thickness of the glass is less than 100 μm and the TTV is at most 10 μm.

24. An article, comprising:
a chemically toughened glass having a thickness of less than or equal to 100 μm, the glass having a working point $T_4$ of more than 1100° C. and the glass in the temperature range between 25° C. and 300° C. has an average linear thermal expansion coefficient CTE of more than $6*10^{-6}$/° C., the glass having a threshold diffusivity D of at least 1.5 μm²/hour, the glass having a total thickness variation (TTV) in an area of 0.4 m*0.5 m of:
less than 20% of the thickness when the thickness is between 50 μm and 100 μm; or
at most 10 μm when the thickness is less than 50 μm;
wherein the glass comprises the following components in the indicated amounts (in wt. %):
$SiO_2$ 40-75;
$Al_2O_3$ 10-30;
$B_2O_3$ 0-20;
$Li_2O+Na_2O+K_2O$ 4-30;
$MgO+CaO+SrO+BaO+ZnO$ 0-15;
$TiO_2+ZrO_2$ 0-15; and
$P_2O_5$ 0-10.

25. The article according to claim 24, wherein the glass comprises the following components in the indicated amounts (in wt. %):

| Component | (wt. %) |
|---|---|
| $SiO_2$ | 40-75; |
| $Al_2O_3$ | 10-30; |
| $B_2O_3$ | 0-20; |
| $Li_2O + Na_2O + K_2O$ | 4-30; |
| $MgO + CaO + SrO + BaO + ZnO$ | 0-15; |
| $TiO_2 + ZrO_2$ | 0-15; |
| $P_2O_5$ | 0-10; and |
| $K_2O$ | 0-4. |

26. The article according to claim 24, wherein the chemically toughened glass has a Depth of Layer (DoL) of more than 5 μm and less than 25 μm.

27. The article according to claim 24, wherein the glass has a Depth of Layer (DoL) of less than 50 μm.

28. The article according to claim 24, wherein the article is at least one of a cover film for resistance screens, or an expendable protective film for display screens, cell phones, cameras, gaming gadgets, tablets, laptops, TVs, mirrors, windows, aviation windows, furniture, and white goods.

29. The article according to claim 24, wherein the glass has a compressive stress CS below 1200 MPa.

30. The article according to claim 24, wherein the glass has a compressive stress CS of more than 700 MPa.

31. The article according to claim 24, wherein the glass has a central tension CT of at least 120 MPa.

32. The article according to claim 24, wherein a ratio of a central tension CT of the glass to a compressive stress CS of the glass is in the range of 0.05 to 2.0.

33. The article according to claim 24, wherein the glass has a resistance to temperature gradient (RTG) higher than 50 K.

34. The article according to claim 24, wherein the glass has a resistance to thermal shock (RTS) higher than 75 K.

35. The article of claim 24, wherein the thickness of the glass is less than 100 μm.

* * * * *